US011924786B2

(12) United States Patent
Abotabl et al.

(10) Patent No.: US 11,924,786 B2
(45) Date of Patent: Mar. 5, 2024

(54) SSB ADAPTIVE POWER TRANSMISSION

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/212,454

(22) Filed: Mar. 25, 2021

(65) Prior Publication Data

US 2022/0312349 A1   Sep. 29, 2022

(51) Int. Cl.
*H04W 56/00* (2009.01)
*H04B 17/318* (2015.01)
*H04W 16/28* (2009.01)
*H04W 24/10* (2009.01)
*H04W 28/26* (2009.01)
*H04W 72/02* (2009.01)

(52) U.S. Cl.
CPC ........ *H04W 56/001* (2013.01); *H04B 17/318* (2015.01); *H04W 16/28* (2013.01); *H04W 24/10* (2013.01); *H04W 28/26* (2013.01); *H04W 72/02* (2013.01)

(58) Field of Classification Search
CPC ... H04W 56/001; H04W 16/28; H04W 24/10; H04B 17/318
See application file for complete search history.

(56) References Cited

U.S. PATENT DOCUMENTS

| | | | |
|---|---|---|---|
| 2016/0316490 A1* | 10/2016 | Wang | H04W 76/10 |
| 2019/0053071 A1* | 2/2019 | Ly | H04B 7/0617 |
| 2020/0383146 A1* | 12/2020 | Zhang | H04W 52/18 |
| 2021/0258061 A1* | 8/2021 | Harrebek | H04B 7/0404 |
| 2022/0131584 A1* | 4/2022 | Dalsgaard | H04L 5/0048 |
| 2022/0217660 A1* | 7/2022 | Liu | H04W 56/001 |
| 2022/0295571 A1* | 9/2022 | Da Silva | H04W 56/001 |
| 2022/0322454 A1* | 10/2022 | Choi | H04W 74/0841 |
| 2023/0284156 A1* | 9/2023 | Ericson | H04W 28/0247 |
| | | | 370/318 |

* cited by examiner

*Primary Examiner* — Charles C Jiang
*Assistant Examiner* — Ryan C Kavleski
(74) *Attorney, Agent, or Firm* — Procopio, Cory, Hargreaves & Savitch LLP

(57) ABSTRACT

Apparatus, methods, and computer program products for SSB adaptive power transmission are provided. An example method includes performing a measurement of a medium for transmission of an SSB. The example method further includes transmitting, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

24 Claims, 12 Drawing Sheets

SSB ADAPTIVE POWER TRANSMISSION

BACKGROUND

Technical Field

The present disclosure relates generally to communication systems, and more particularly, to wireless communication systems with synchronization signal blocks (SSBs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory and configured to perform a measurement of a medium for transmission of an SSB. The memory and the at least one processor coupled to the memory may be further configured to transmit, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

In another aspect of the disclosure, a method, a computer-readable medium, and an apparatus are provided. The apparatus may include a memory and at least one processor coupled to the memory and configured to perform a measurement of a medium for transmission of an SSB. The memory and the at least one processor coupled to the memory may be further configured to receive an indication of a first transmission power for a first SSB transmission and a second transmission power for a second SSB transmission. The memory and the at least one processor coupled to the memory may be further configured to measure a reference signal received power (RSRP) value for each received SSB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
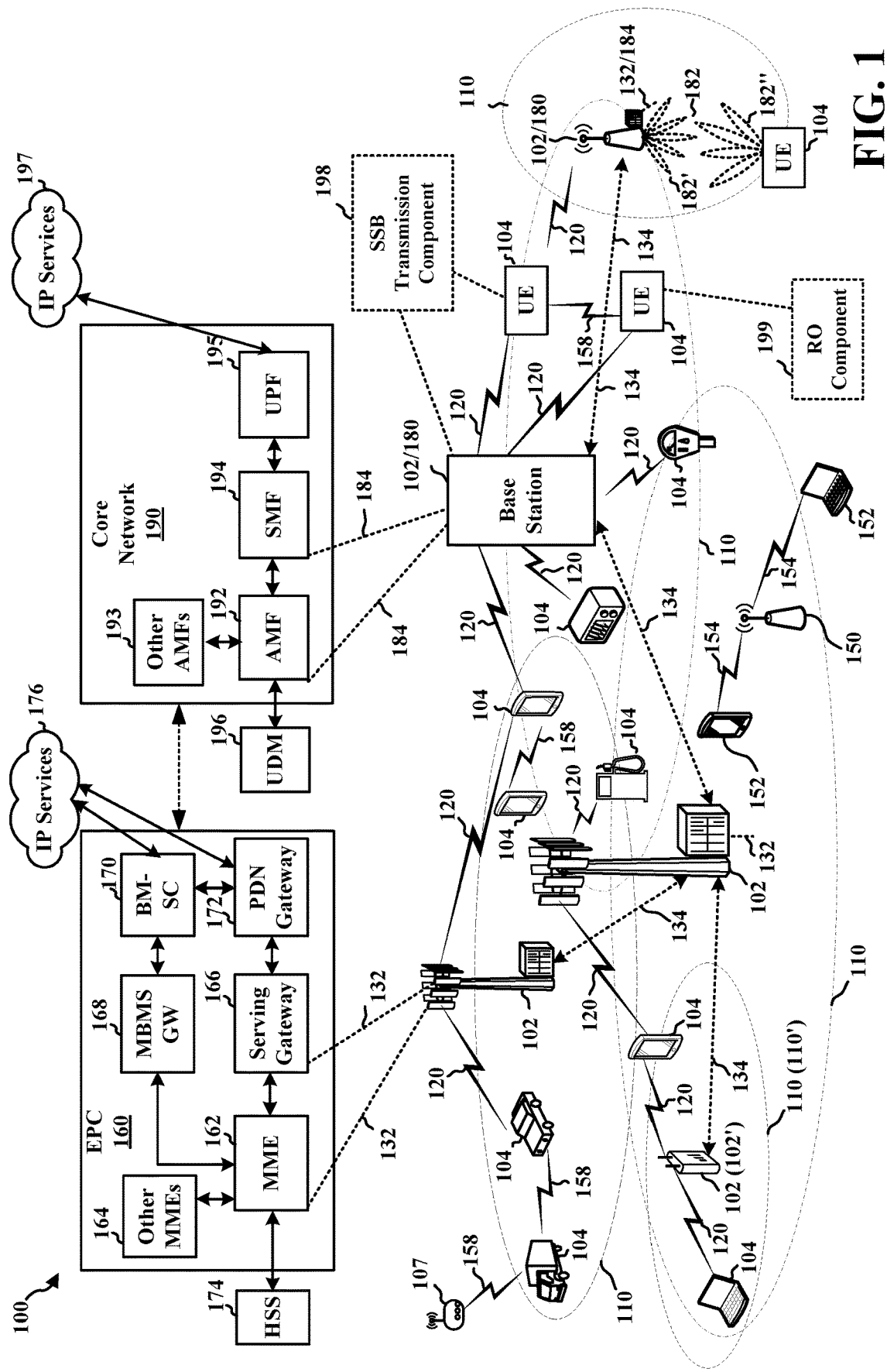
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In wireless communication systems wireless devices may share wireless resources with other wireless devices. For example, wireless devices communicating based on one radio access technology may communicate on an unlicensed band that comprises a shared spectrum that is shared with other radio access technologies (RATs). To avoid disruption of operation of other devices, a wireless device, such as UE or a base station, may perform an LBT procedure before transmitting in the unlicensed spectrum. In the LBT procedure, a device senses the channel by detecting the energy in a given frequency band, such as the unlicensed frequency band. If the detected energy is less than a threshold, the channel is available and the device may use it for transmission. If the detected energy is above a threshold, the channel may be determined to be occupied and the device may back-off and perform another LBT until the channel is available.

Similar to LBT, in sidelink communication, a UE may perform a sensing procedure in order to receive and decode resource reservations of other UEs. The UE may select resources for sidelink transmission from a set of candidate resources after excluding resources reserved by other UEs. In some aspects, the UE may exclude reserved resources if a measurement, such as an RSRP measurement of sidelink control information (SCI) reserving the resource meets an RSRP threshold.

SSBs and other information that is important to deliver for initial access and radio link monitoring (RLM) or radio resource management (RRM) may also be transmitted based on successful completion of the LBT procedure or based on available sidelink resources that are not reserved by another UE. Under such an LBT procedure or sidelink sensing procedure, the chance for the SSBs to be transmitted is uncertain. However, dropping an SSB candidate may lead to increased latency in RSRP measurements at the UE side. Dropping the SSB candidate may also lead to waste of power because a UE may attempt to decode the SSB that was originally dropped out. Better chances of successfully transmitting the SSBs may facilitate more reliable performance of the communication system. Aspects provided herein provide mechanisms for a device to transmit the SSB with a smaller transmission power depending on the detected energy which may provide more reliable SSB transmission.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 or the base station 180 may include an SSB transmission component 198. The SSB transmission aspect component 198 may be configured to perform a measurement of a medium for transmission of an SSB. The SSB transmission aspect component 198 may be further configured to transmit, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

In certain aspects, the UE 104 may include a RO component 199. In some aspects, the RO component 199 may be configured to receive an indication of a first transmission power for a first SSB transmission and a second transmission power for a second SSB transmission. In some aspects, the random access occasion (RO) component 199 may be further configured to measure a reference signal received power (RSRP) value for each received SSB.

Although the following description may be focused on 5G NR, the concepts described herein may be applicable to other similar areas, such as LTE, LTE-A, CDMA, GSM, and other wireless technologies.

Figure 2:
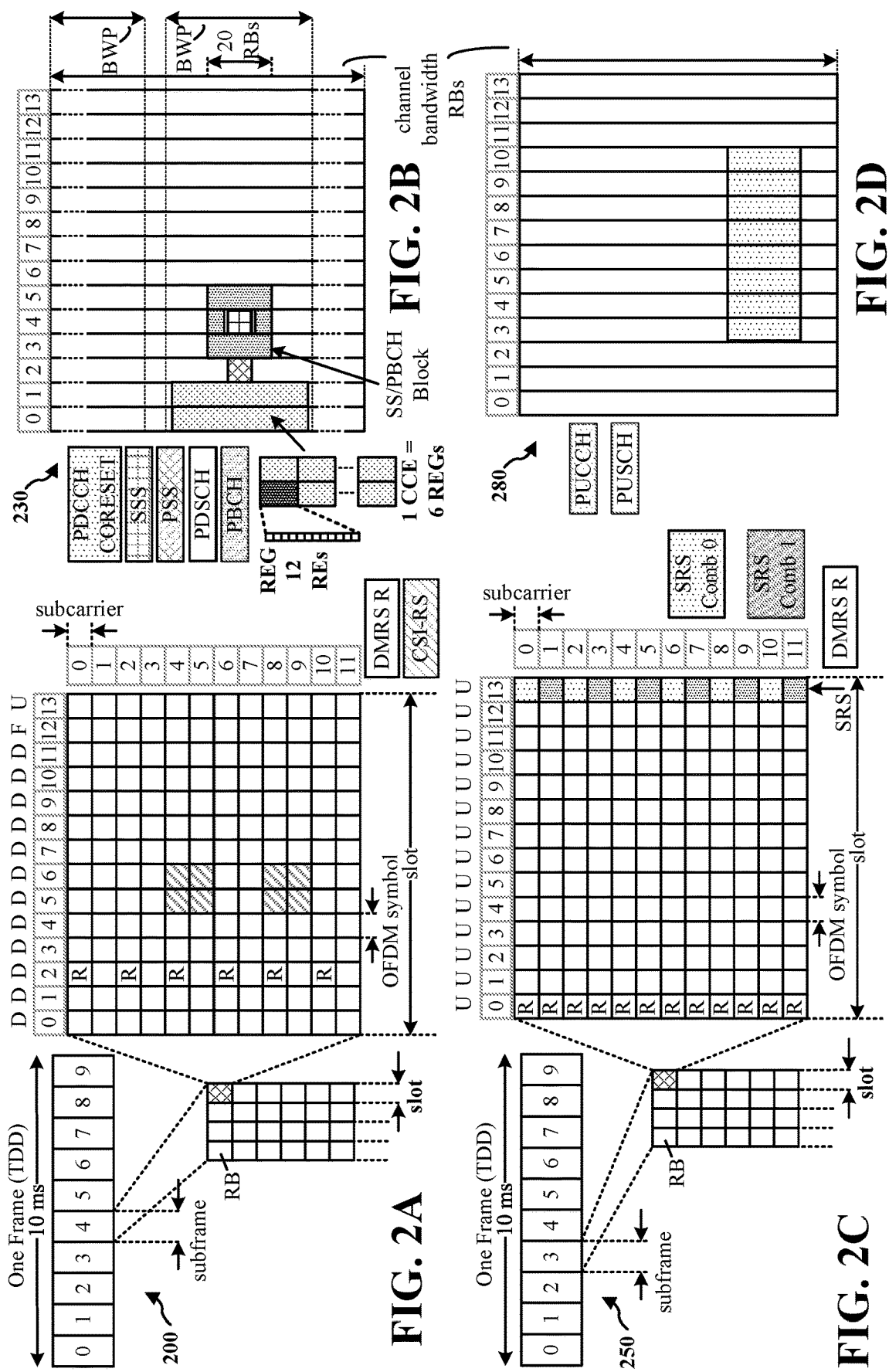
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
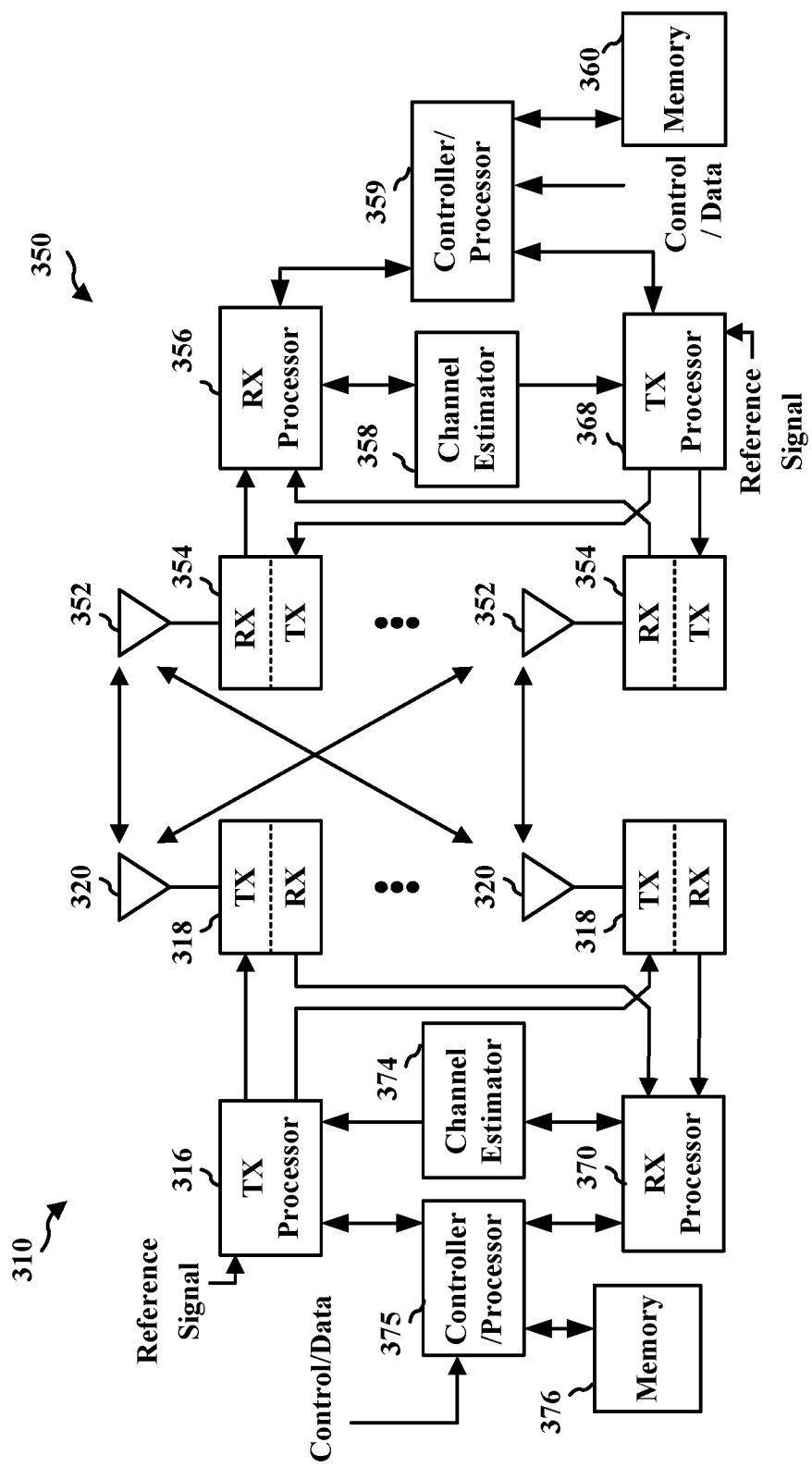
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SSB transmission component 198 or RO component 199 of FIG. 1.

At least one of the TX processor 316, the RX processor 370, and the controller/processor 375 may be configured to perform aspects in connection with SSB transmission component 198 of FIG. 1.

In wireless communication systems wireless devices may share wireless resources with other wireless devices. For example, wireless devices communicating based on one radio access technology may communicate on an unlicensed band that comprises a shared spectrum that is shared with other RATs. To avoid disruption of operation of other devices, a wireless device, such as UE or a base station, may perform an LBT procedure before transmitting in the unlicensed spectrum. In the LBT procedure, a device senses the channel by detecting the energy in a given frequency band, such as the unlicensed frequency band. If the detected energy is less than a threshold, the channel is available and the device may use it for transmission. If the detected energy is above a threshold, the channel may be determined to be occupied and the device may back-off and perform another LBT until the channel is available.

Similar to LBT, in sidelink communication, a UE may perform a sensing procedure in order to receive and decode resource reservations of other UEs. The UE may select resources for sidelink transmission from a set of candidate resources after excluding resources reserved by other UEs. In some aspects, the UE may exclude reserved resources if a measurement, such as an RSRP measurement of sidelink control information (SCI) reserving the resource meets an RSRP threshold.

SSBs and other information that is important to deliver for initial access and radio link monitoring (RLM) or radio resource management (RRM) may also be transmitted based on successful completion of the LBT procedure or based on available sidelink resources that are not reserved by another UE. Under such an LBT procedure or sidelink sensing procedure, the chance for the SSBs to be transmitted is uncertain. However, dropping an SSB candidate may lead to increased latency in RSRP measurements at the UE side. Dropping the SSB candidate may also lead to waste of power because a UE may attempt to decode the SSB that was originally dropped out. Better chances of successfully transmitting the SSBs may facilitate more reliable performance of the communication system. Aspects provided herein provide mechanisms for a device to transmit the SSB with a smaller transmission power depending on the detected energy which may provide more reliable SSB transmission.

Figure 4:
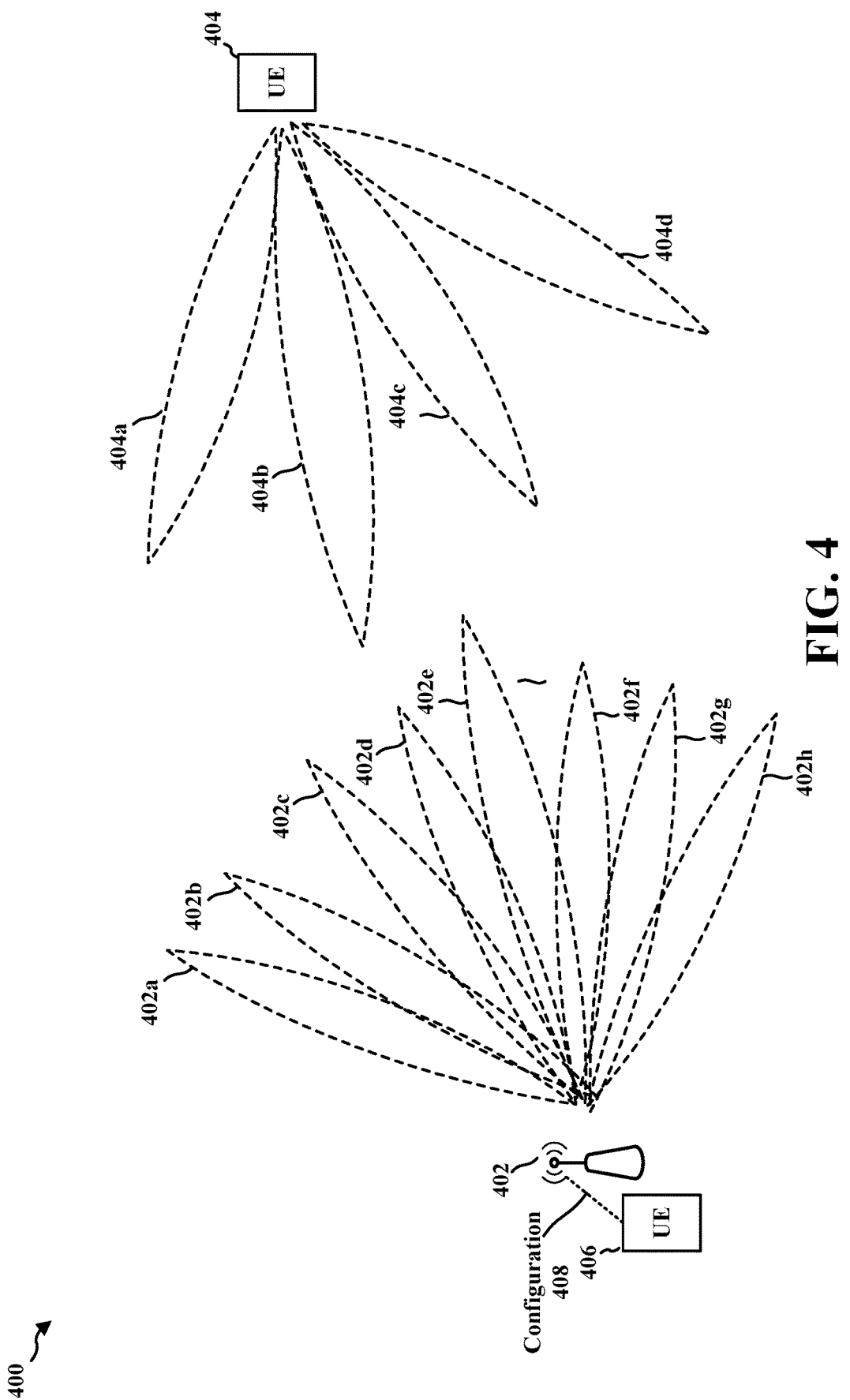
FIG. 4 is a diagram illustrating a base station in communication with a UE via a set of beams.

FIG. 4 is a diagram illustrating a base station in communication with a UE via a set of beams. Referring to FIG. 4, a base station 402 or a UE 406 may transmit a beamformed signal to a UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 or the UE 406 may receive the beamformed signal from the UE 404 in one or more of the receive directions 402a-402h. The base station 402/UE 404/406 may perform beam training to determine the best receive and transmit directions for each of the base station 402/UE 404/406. The transmit and receive directions for the base station 402/UE 406 may or may not be the same. The transmit and receive directions for the UE 404 may or may not be the same. Each beam may be associated with an SSB. For example, the base station 402 may periodically transmit an SSB to allow the UE 404 the opportunity to synchronize with the system. In some aspects, the base station 402 may transmit multiple instances of SSBs in a synchronization burst. In a synchronization burst, multiple SSB transmissions may be sent within a 5 ms time window. The multiple SSB transmissions may allow for coverage enhancements and/or directional beams to the UE 404 in different locations. Within a 5 ms time window, for 30 KHz/15 KHz subcarrier spacing, up to 20/10 SSB positions may be allowed. In some aspects, the UE 406 may be communicating with the UE 404 and the UE 406 may receive various configurations 408 from the base station 402.

Figure 5:
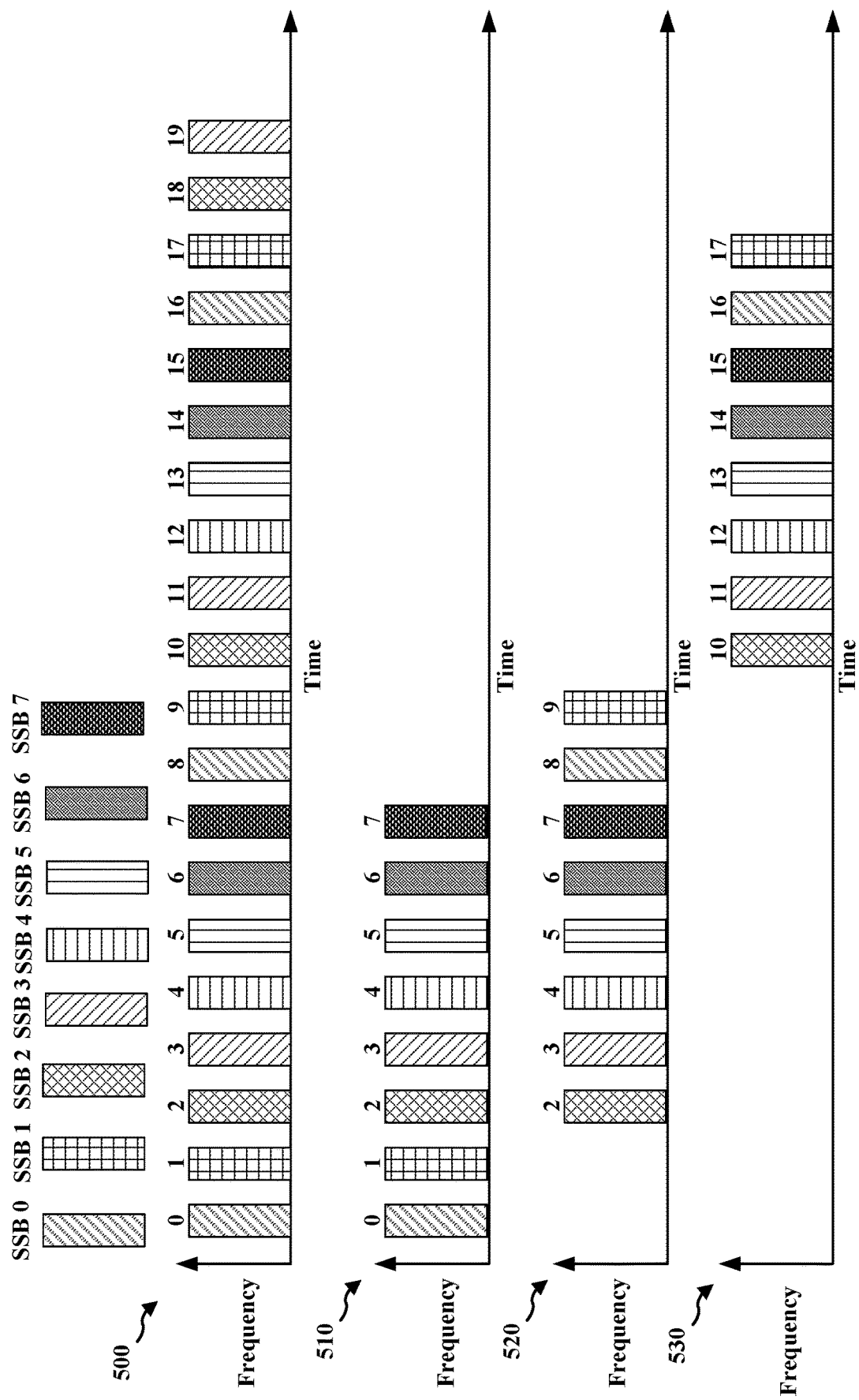
FIG. 5 is a diagram illustrating examples of SSB transmission.

SSB candidates may be quasi-co-located (QCL'd). For example, a QCL relation factor Q may be introduced such that the SSB positions that are apart by Q in time may be QCL'd. For example, if the base station 402 failed to transmit SSB at position (in time) X, it may have another chance to send it at position X+Q. In some aspects, Q may be equal to 1,2,4 or 8 and may be included in a master information block (MIB) or UE specific configured for RLM/RRM. FIG. 5 is a diagram illustrating examples of SSB transmission. In example 500, a total of 20 SSB positions may be allowed and the QCL relation factor Q may be 8. For example, 8 SSBs 0, 1, 2, 3, 4, 5, 6, 7 may be planned to be transmitted at SSB locations 0-7 and 8-15. SSBs 0-3 may be additionally planned to be transmitted at SSB locations 16-19. As illustrated in example 510, the SSBs 0-7 may be transmitted at SSB locations 0-7. If the base station 402 missed the transmission of SSB 0 and SSB 1, as illustrated in example 520, SSB 0 and SSB 1 may be transmitted at SSB location 8 and 9. Similarly, SSBs 2-7 may also be transmitted at SSB locations 10-15 and SSB 0 and SSB 1 may be transmitted at SSB location 16 and 17 as illustrated in example 530.

Figure 6A:
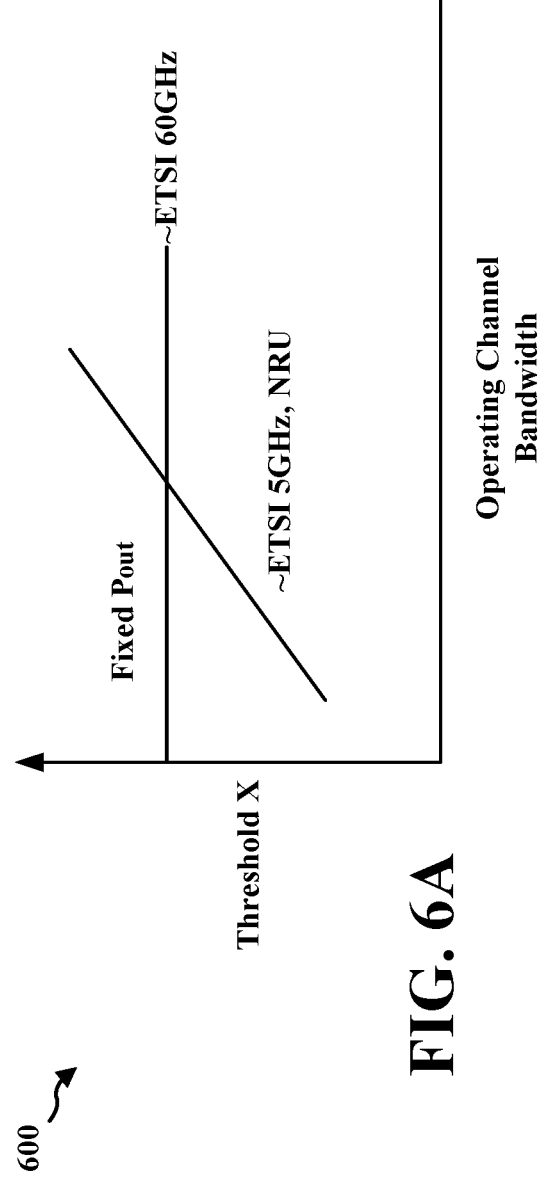
FIG. 6A is a diagram illustrating examples of bandwidth and sensing threshold for listen-before-talk (LBT) sensing.

For the LBT procedure, in some aspects, the sensing threshold (energy threshold to determine whether the channel may be used to transmit a signal) may be fixed or variable. FIG. 6A is a diagram 600 illustrating examples of bandwidth and sensing threshold for LBT sensing. For example, European Telecommunications Standards Institute (ETSI) provided a model that includes a threshold $X_T(P_{out})$ that is a may be a function of max effective isotropic radiated power (EIRP) $P_{out}$ (e.g. for $P_{out}$ in decibel-milliwatts dBm). In one example, $X_T(P_{out})$=−47 dBm+(40 dBm−$P_{out}$) for 60 GHz and may be independent of bandwidth of the operating channel. In another example, the $X_T(P_{out})$ may be a function of a bandwidth B and the $P_{out}$, such as $X_T(P_{out})$=−73 dBm+10*log 10(B)+(23 dBm−$P_{out}$). The threshold may increase with bandwidth contended, for fixed EIRP $P_{out}$.

Figure 6B:
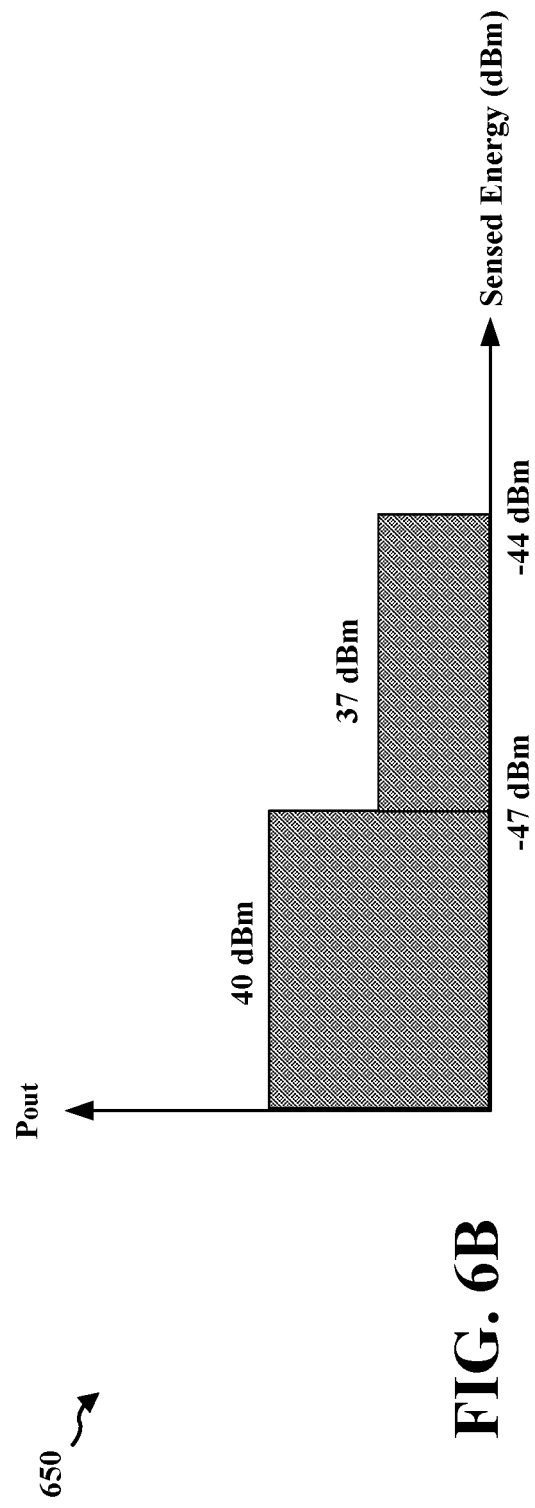
FIG. 6B is a diagram illustrating examples of variable threshold LBT and output power.

FIG. 6B is a diagram 650 illustrating examples of variable threshold LBT and output power. As previously explained, based on the ETSI's model for 60 GHz, the threshold may be a function of the transmit power given by: $X_T(P_{out})$=−47+(40−$P_{out}$) dBm. For a base station with two panels where each single panel delivers 37dBm and both panel may collectively deliver 40 dBm, if an SSB may be transmitted from both panels (40 dBm), then the sensing threshold may be −47 dBm. Therefore, if sensed energy is less than −47 dBm, the SSB can be sent out from both panels. If SSB may be transmitted for one panel (37 dBm), then the sensing threshold may be −44 dBm. Therefore, if the sensed energy is less than −44 dB, the SSB may be sent out from one panel. The EIRP $P_{out}$ may be adapted based on the sensed energy based on the examples shown in FIG. 7.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 7:
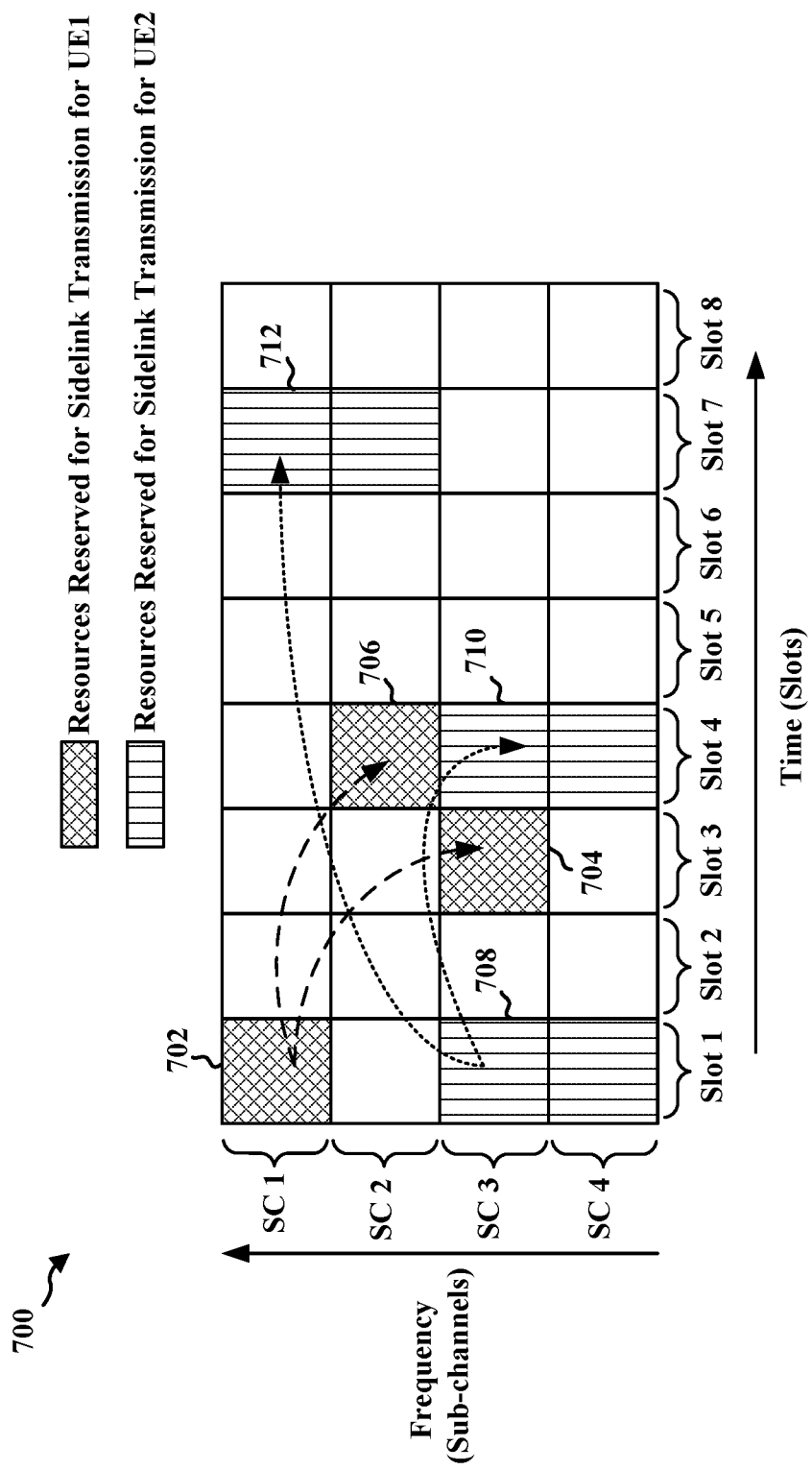
FIG. 7 is a diagram illustrating a sidelink sensing and reservation mechanism.

FIG. 7 is an example 700 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 700, which provides 32 available resource blocks in total. This window may also be referred to as a resource selection window. A first UE ("UE1") may reserve a sub-channel (e.g., SC 1) in a current slot (e.g., slot 1) for its initial data transmission 702, and may reserve additional future slots within the window for data retransmissions (e.g., 704 and 706). For example, UE1 may reserve sub-channels SC 3 at slots 3 and SC 2 at slot 4 for future retransmissions. UE1 then transmits information regarding which resources are being used and/or reserved by it to other UE(s). UE1 may do by including the reservation information in the reservation resource field of the SCI, e.g., a first stage SCI.

FIG. 7 illustrates that a second UE ("UE2") reserves resources in sub-channels SC 3 and SC 4 at time slot 1 for its current data transmission 708, and reserve first data retransmission 710 at time slot 4 using sub-channels SC 3 and SC 4, and reserve second data retransmission 712 at time slot 7 using sub-channels SC 1 and SC 2 as shown by FIG. 7. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 7 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 7, the UE may transmit SCI reserving resources for data transmissions 708, 710, and 712.

Thus, at times, a particular resource may not be available for sidelink transmission from the UE based on a previous reservation by another UE. Similar to the failure to pass LBT, the UE may be delayed in transmitting SSB and may drop, e.g., skip transmission of an SSB candidate.

As previously explained, dropping an SSB candidate may lead to increased latency in RSRP measurements at the UE side. Dropping an SSB candidate may also lead to waste of power because a UE, such as the UE 404, may attempt to decode the SSB that was originally dropped out. Better chances of successfully transmitting the SSBs may facilitate more reliable performance of the communication system. Aspects provided herein allows a node, such as the base station 402, to transmit the SSB with a smaller transmission power depending on the detected energy. The smaller transmission power may lead to less interference and may still give a recipient, such as the UE 404, an opportunity to detect the SSB candidate.

Figure 8:
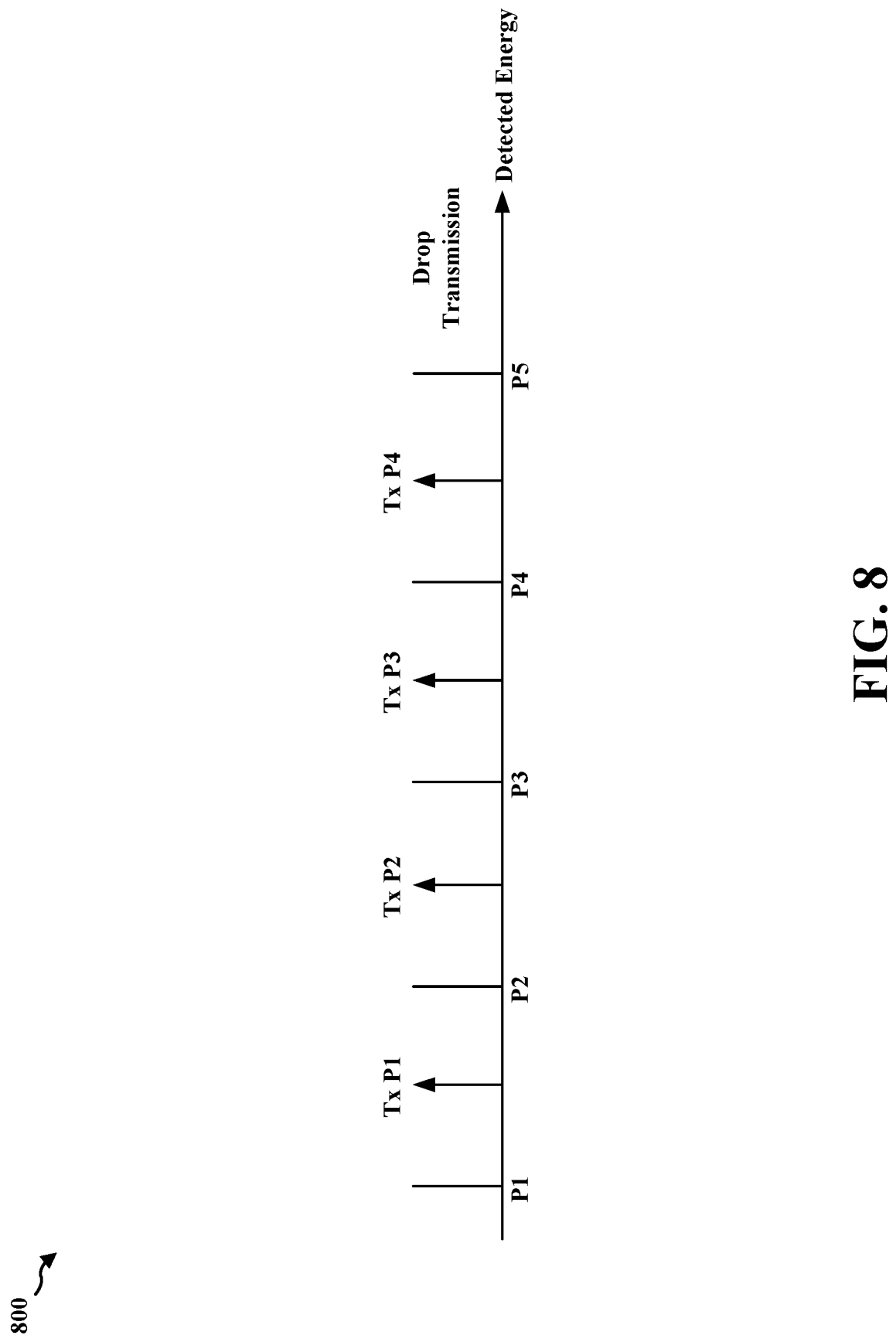
FIG. 8 is a diagram illustrating examples of transmission power thresholds for ranges of detected energy.

In some aspects, during the transmission of candidate SSB blocks, the node transmitting the SSB, such as the base station 402 or a UE transmitting the SSB, may determine whether to: 1) drop the SSB candidate; 2) transmit the SSB candidate with a regularly assumed (i.e., default) power, or 3) transmit the SSB candidate with a smaller power. If the node is a UE, such as the UE 406 in FIG. 4, the UE 406 may be configured by the network, such as the base station 402, on how to behave with the SSB transmissions. Therefore, the node may adapt the SSB power based on the direction/beam of the SSB candidate and the detected energy in the direction. As illustrated in example 800 in FIG. 8, multiple threshold values are defined with different transmission powers for each range of detected energy. For example, if the detected energy is between a first threshold P1 and a second threshold P2, transmission power Tx P1 may be used by the node. If the detected energy is between the second threshold P2 and a third threshold P3, transmission power Tx P2 may be used by the node. If the detected energy is between the third threshold P3 and a fourth threshold P4, transmission power Tx P3 may be used by the node. If the detected energy is between the fourth threshold P4 and a fifth threshold P5, transmission power Tx P4 may be used by the node. If the detected energy exceeds a threshold P5, the node may drop the transmission of the SSB.

In some aspects, transmission power level of the SSB may be signaled in the MIB information. For example, the transmission power level may be represented in an offset from the regular (default) transmission power, such as −3 dB, −4 dB, −5 dB and −6 dB. The transmission power level information may be sent in a number of bits in the MIB. The number of bits may depend on the number of power levels. In some aspects, during an initial access procedure of the UE 404, the UE 404 may select a RO based on the SSB with highest RSRP value given its Tx power.

Figure 9:
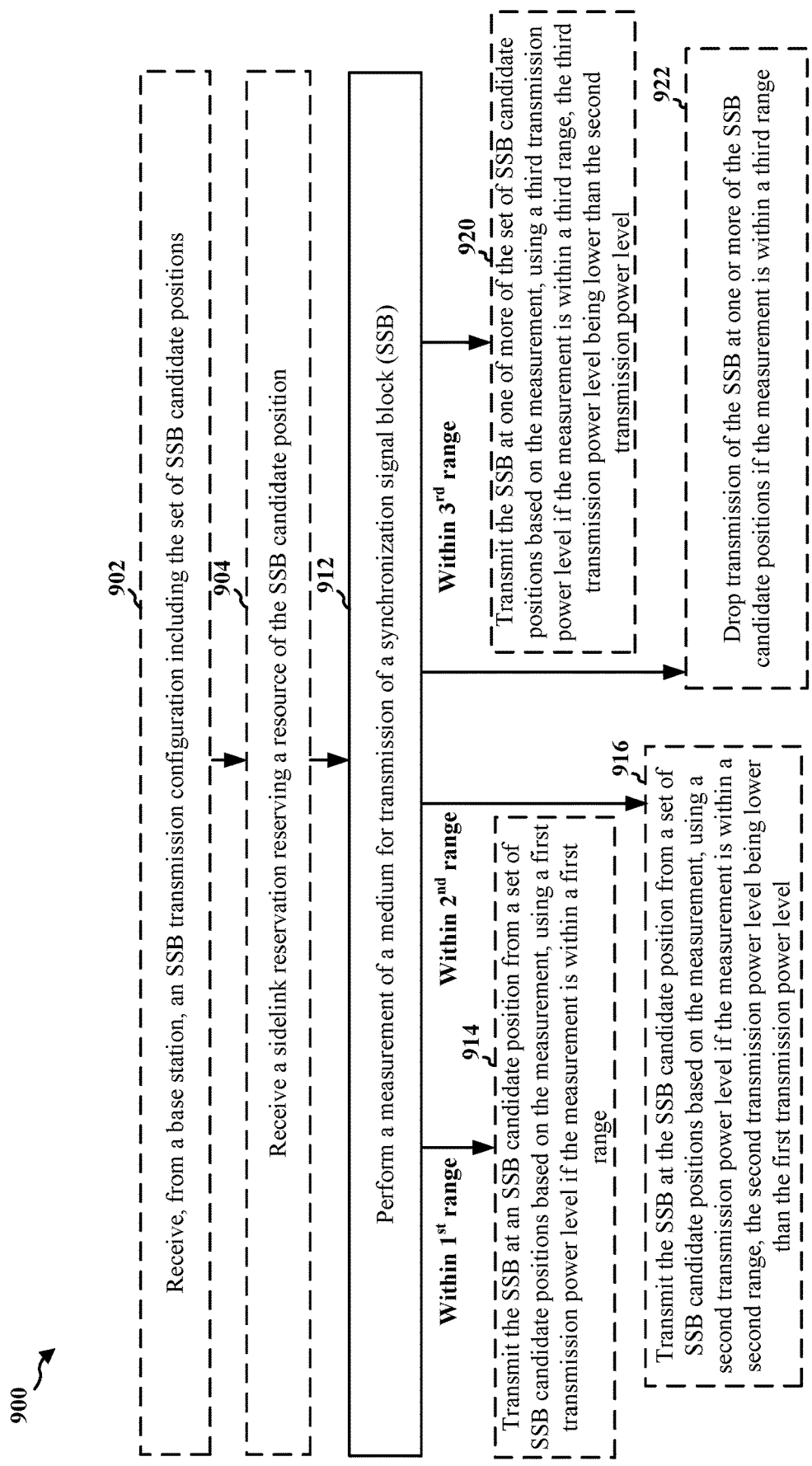
FIG. 9 is a flowchart of a method of wireless communication performed by a user equipment (UE) or a base station.

FIG. 9 is a flowchart 900 of a method of wireless communication that may be performed by a node. In some aspects, the method may be performed by a UE (e.g., the UE 104, the UE 406; the apparatus 1102). In some aspects, the method may be performed by a base station (e.g., the base station 102/180, the base station 402; the apparatus 1202). Optional steps are illustrated in dashed lines. The steps are not necessarily illustrated in chronological order.

At 912, the node may perform a measurement of a medium for transmission of an SSB. In some aspects, 912 may be performed by measurement component 1142 in FIG. 11. In some aspects, 912 may be performed by measurement component 1242 in FIG. 12. In some aspects, the node may be a base station, such as the base station 402, and the base station may perform an LBT measurement for an unlicensed medium as part of 912, such as described in connection with FIG. 6A or FIG. 6B. In some aspects, the node may be a UE, such as the UE 406, and the measurement may include measuring a RSRP associated with the sidelink reservation, e.g., as described in connection with FIG. 7.

The node may transmit the SSB at an SSB candidate position from a set of SSB candidate positions based on the measurement. If the measurement is within a first range, at 914, the node may transmit the SSB at an SSB candidate position using a first transmission power level. FIG. 5 illustrates an example set of SSB candidate positions. In some aspects, 914 may be performed by SSB transmission component 1144 in FIG. 11. In some aspects, 914 may be performed by SSB transmission component 1244 in FIG. 12. In some aspects, the measurement is for a beam direction, and the SSB candidate position is associated with the beam direction. In some aspects, as part of transmitting the SSB, the node may signal a reduced transmission power level in the SSB. In some aspects, the reduced power level is represented by an offset from a regular power level. In some aspects, the offset is represented by a number of dBs. In some aspects, the reduced transmission power level is signaled in a MIB transmitted from the base station. In some aspects, the first range may correspond with a range between Px and Py, x and y being 1, 2, 3, 4, or 5 in FIG. 8.

If the measurement is within a second range, at 916, the node may transmit the SSB at the SSB candidate position using a second transmission power level, the second transmission power level may be lower than the first transmission power level. In some aspects, 916 may be performed by SSB transmission component 1144 in FIG. 11. In some aspects, 916 may be performed by SSB transmission component 1244 in FIG. 12. In some aspects, the second range may correspond with a range between Px and Py, x and y being 1, 2, 3, 4, or 5 in FIG. 8.

If the measurement is within a third range, at 920, the node may transmit the SSB at one of more of the set of SSB candidate positions using a third transmission power level, the third transmission power level may be lower than the second transmission power level. In some aspects, 920 may be performed by SSB transmission component 1144 in FIG. 11. In some aspects, 920 may be performed by SSB transmission component 1244 in FIG. 12. In some aspects, the third range may correspond with a range between Px and Py, x and y being 1, 2, 3, 4, or 5 in FIG. 8.

At 922, the node may drop transmission of the SSB at one or more of the SSB candidate positions if the measurement is within a third range. In some aspects, 922 may be performed by drop transmission component 1146 in FIG. 11. In some aspects, 922 may be performed by drop transmission component 1246 in FIG. 12. In some aspects, the third range may correspond with the range higher than P5 in FIG. 8.

In some aspects, the node may be a UE, such as the UE 406. At 902, the UE may receive, from a base station, an SSB transmission configuration including the set of SSB candidate positions. In some aspects, 902 may be performed by configuration reception component 1152 in FIG. 11. In some aspects, the SSB transmission configuration comprises a set of multiple threshold values for the measurement, such as the multiple threshold values illustrated in FIG. 8. In some aspects, the set of multiple threshold values includes multiple threshold values associated with different reduced transmission power levels. At 904, the UE may receive a sidelink reservation reserving a resource of the SSB candidate position. In some aspects, 904 may be performed by sidelink reservation component 1154 in FIG. 11.

Figure 10:
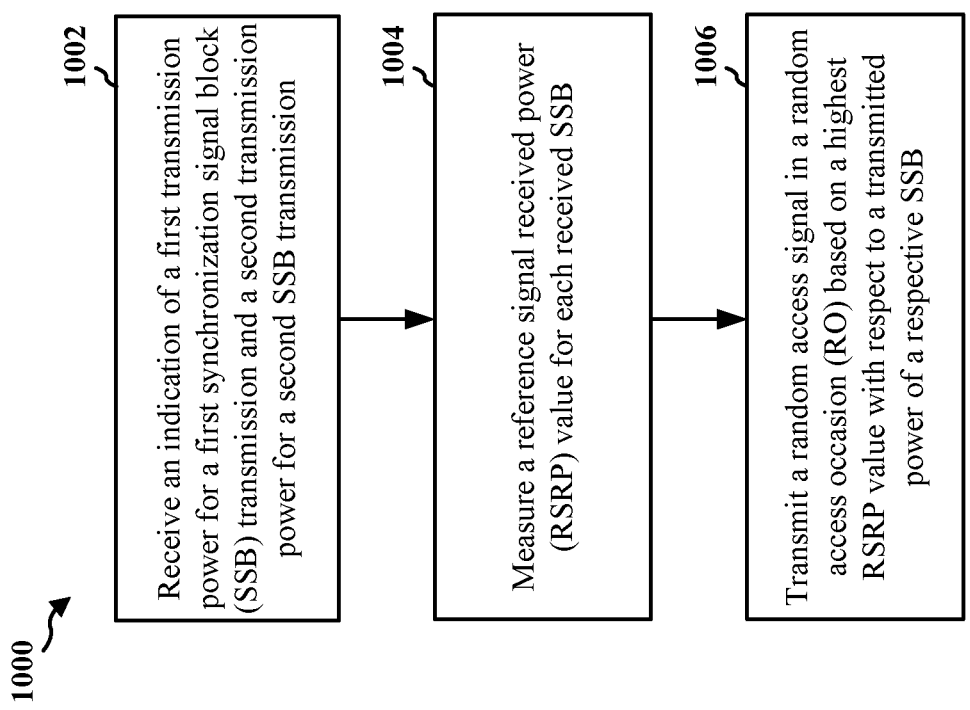
FIG. 10 is a flowchart of a method of wireless communication performed by a UE.

FIG. 10 is a flowchart 1000 of a method of wireless communication. The method may be performed by a UE (e.g., the UE 104, the UE 404; the apparatus 1102). Optional steps are illustrated in dashed lines. The steps are not necessarily illustrated in chronological order. At 1002, the UE may receive an indication of a first transmission power for a first SSB transmission and a second transmission power for a second SSB transmission. In some aspects, 1002 may be performed by indication reception component 1148 in FIG. 11. In some aspects, the UE may receive the indication in a MIB.

At 1004, the UE may measure a RSRP value for each received SSB. In some aspects, 1004 may be performed by measurement component 1142 in FIG. 11. At 1006, the UE may transmit a random access signal in a RO based on a highest RSRP value with respect to a transmitted power of a respective SSB. In some aspects, 1006 may be performed by random access signal component 1150 in FIG. 11.

Figure 11:
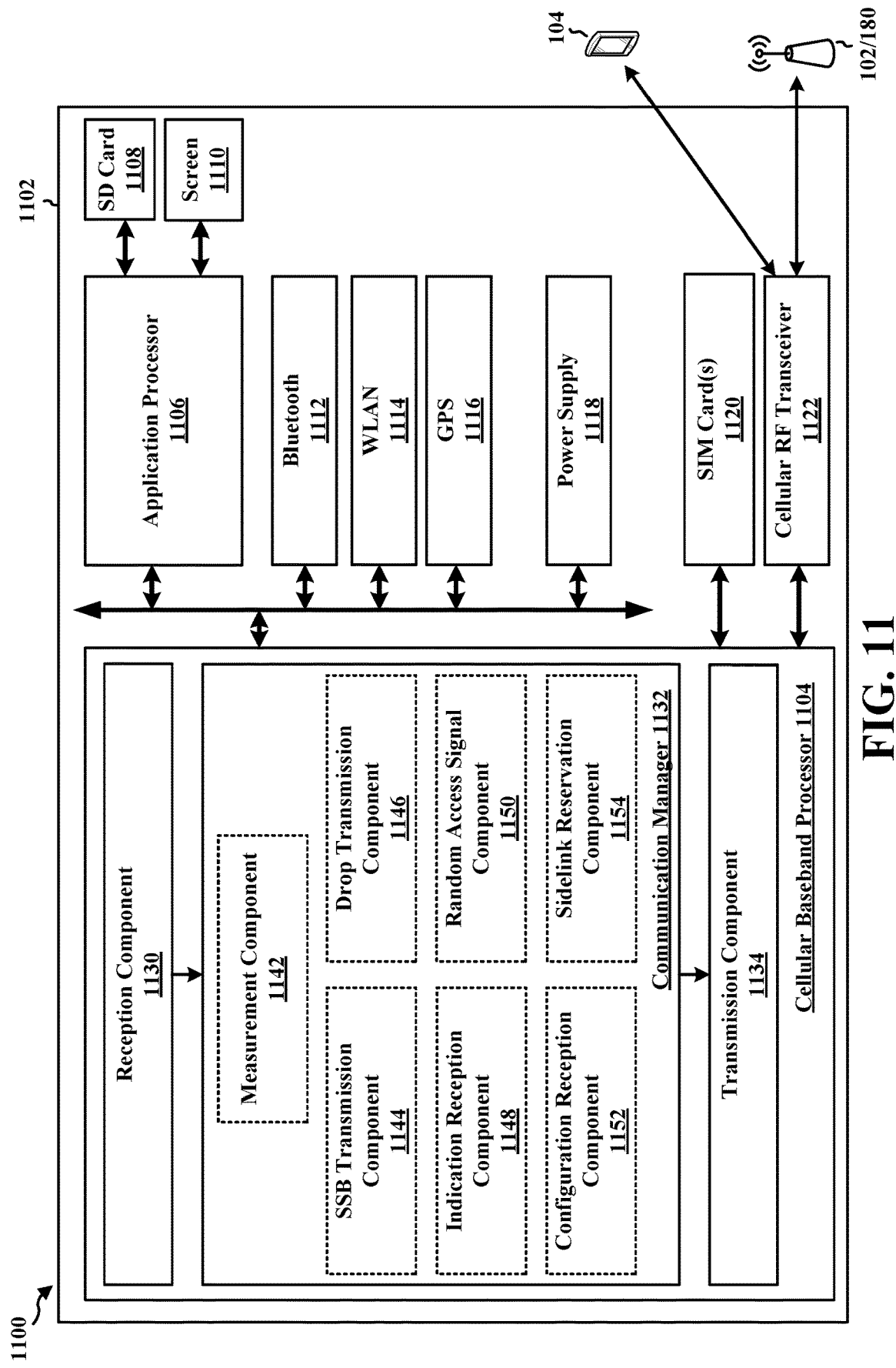
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a baseband unit 1104, such as a cellular base band processor (also referred to as a modem), coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The baseband unit 1104 communicates through the cellular RF transceiver 1122 with the UE 104 and/or BS 102/180. The baseband unit 1104 may include a computer-readable medium/memory. The computer-readable medium/memory may be non-transitory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the UE 350 and may include the memory 360 and/or at least one of the TX processor 368, the RX processor 356, and the controller/processor 359. In one configuration, the apparatus 1102 may be a modem chip and include just the baseband unit 1104, and in another configuration, the apparatus 1102 may be the entire UE (e.g., see 350 of FIG. 3) and include the additional modules of the apparatus 1102.

The communication manager 1132 may include a measurement component 1142 that is configured to perform a measurement of a medium for transmission of an SSB or measure a RSRP value for each received SSB, e.g., as described in connection with 912 in FIGS. 9 and 1004 in FIG. 10. The communication manager 1132 may further include a SSB transmission component 1144 that is configured to transmit, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level, or transmit the SSB at one of more of the set of SSB candidate positions using a third transmission power level if the measurement is within a third range, the third transmission power level being lower than the second transmission power level, e.g., as described in connection with 914, 916, and 920 in FIG. 9. The communication manager 1132 may further include a drop transmission component 1146 that is configured to drop transmission of the SSB at one or more of the SSB candidate positions if the measurement is within a third range, e.g., as described in connection with 922 in FIG. 9. The communication manager 1132 may further include a configuration reception component 1152 that is configured to receive, from a base station, an SSB transmission configuration including the set of SSB candidate positions, e.g., as described in connection with 902 in FIG. 9. The communication manager 1132 may further include a sidelink reservation component 1154 that is configured to receive a sidelink reservation reserving a resource of the SSB candidate position, e.g., as described in connection with 904 in FIG. 9. The communication manager 1132 may further include an indication reception component 1148 that is configured to receive an indication of a first transmission power for a first SSB transmission and a second transmission power for a second SSB transmission, e.g., as described in connection with 1002 in FIG. 10. The communication manager 1132 may further include a random access signal component 1150 that is configured to transmit a random access signal in a RO based on a highest RSRP value with respect to a transmitted power of a respective SSB, e.g., as described in connection with 1006 in FIG. 10.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for performing a measurement of a medium for transmission of an SSB. The baseband unit 1104 may further include means for transmitting, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level. The baseband unit 1104 may further include means for dropping transmission of the SSB at one or more of the SSB candidate positions if the measurement is within a third range. The baseband unit 1104 may further include means for transmitting the SSB at one of more of the set of SSB candidate positions using a third transmission power level if the measurement is within a third range, the third transmission power level being lower than the second transmission power level. The baseband unit 1104 may further include means for receiving, from a base station, an SSB transmission configuration including the set of SSB candidate positions. The baseband unit 1104 may further include means for receiving a sidelink reservation reserving a resource of the SSB candidate position. The baseband unit 1104 may further include means for receiving an indication of a first transmission power for a first SSB transmission and a second transmission power for a second SSB transmission. The baseband unit 1104 may further include means for measuring a RSRP value for each received SSB. The baseband unit 1104 may further include means for transmitting a random access signal in a random access occasion based on a highest RSRP value with respect to a transmitted power of a respective SSB.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
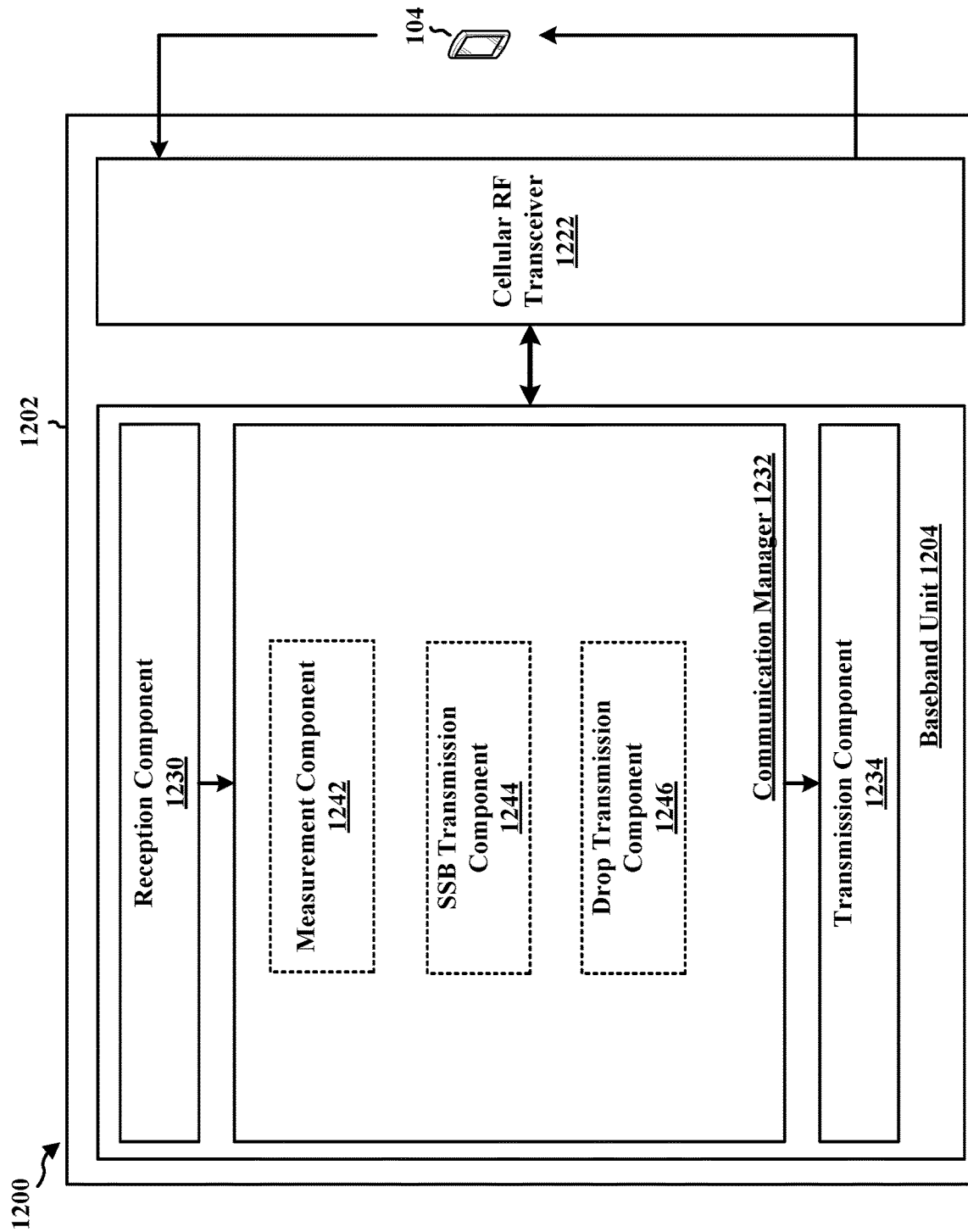
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 may include a measurement component 1242 that may perform a measurement of a medium for transmission of an SSB, e.g., as described in connection with 912 in FIG. 9. The communication manager 1232 may further include an SSB transmission component 1244 that may transmit, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level, or transmit the SSB at one of more of the set of SSB candidate positions using a third transmission power level if the measurement is within a third range, the third transmission power level being lower than the second transmission power level, e.g., as described in connection with 914, 916, and 920 in FIG. 9. The communication manager 1232 may further include a drop transmission component 1246 that may drop transmission of the SSB at one or more of the SSB candidate positions if the measurement is within a third range, e.g., as described in connection with 922 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for performing a measurement of a medium for transmission of an SSB. The baseband unit 1204 may further include means for transmitting, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level. The baseband unit 1204 may further include means for dropping transmission of the SSB at one or more of the SSB candidate positions if the measurement is within a third range. The baseband unit 1204 may further include means for transmitting the SSB at one of more of the set of SSB candidate positions using a third transmission power level if the measurement is within a third range, the third transmission power level being lower than the second transmission power level.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication, comprising: performing a measurement of a medium for transmission of a SSB; and transmitting, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

Aspect 2 is the method of aspect 1, further comprising dropping transmission of the SSB at one or more of the SSB candidate positions if the measurement is within a third range.

Aspect 3 is the method of any of aspects 1-2, wherein measurement is for a beam direction, and the SSB candidate position is associated with the beam direction.

Aspect 4 is the method of any of aspects 1-3, further comprising transmitting the SSB at one of more of the set of SSB candidate positions using a third transmission power level if the measurement is within a third range, the third transmission power level being lower than the second transmission power level.

Aspect 5 is the method any of aspects 1-4, further comprising signaling a reduced transmission power level in the SSB.

Aspect 6 is the method of any of aspects 1-5, wherein the reduced power level is represented by an offset from a regular power level.

Aspect 7 is the method of any of aspects 1-6, wherein the offset is represented by a number of dB.

Aspect 8 is the method of any of aspects 1-7, wherein the method is performed at a base station, and performing the measurement includes performing an LBT measurement for an unlicensed medium.

Aspect 9 is the method of any of aspects 1-8, wherein the reduced transmission power level is signaled in a MIB transmitted from the base station.

Aspect 10 is the method of any of aspects 1-9, wherein the method is performed at a user equipment, the method further comprising: receiving, from a base station, an SSB transmission configuration including the set of SSB candidate positions; and receiving a sidelink reservation reserving a resource of the SSB candidate position, wherein the measurement comprises measuring a RSRP associated with the sidelink reservation.

Aspect 11 is the method of any of aspects 1-10, wherein the SSB transmission configuration comprises a set of multiple threshold values for the measurement.

Aspect 12 is the method of any of aspects 1-11, wherein the set of multiple threshold values includes multiple threshold values associated with different reduced transmission power levels.

Aspect 13 is a method of wireless communication at a UE, comprising: receiving an indication of a first transmission power for a first SSB transmission and a second transmission power for a second SSB transmission; and measuring a RSRP value for each received SSB.

Aspect 14 is the method of aspect 13, further comprising: transmitting a random access signal in a RO based on a highest RSRP value with respect to a transmitted power of a respective SSB.

Aspect 15 is the method of any of aspects 13-15, wherein the UE received the indication in a MIB.

Aspect 16 is an apparatus for wireless communication, comprising: a memory; and at least one processor coupled to the memory and configured to: perform a measurement of a medium for transmission of a SSB; transmit the SSB at an SSB candidate position from a set of SSB candidate positions, using a first transmission power level if the measurement being within a first range; and transmit, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

Aspect 17 is the apparatus of aspect 16, wherein the memory and the at least one processor are further configured to: drop transmission of the SSB at one or more of the SSB candidate positions if the measurement is within a third range.

Aspect 18 is the apparatus of any of aspects 16-17, wherein the measurement is for a beam direction, and the SSB candidate position is associated with the beam direction.

Aspect 19 is the apparatus of any of aspects 16-18, wherein the memory and the at least one processor are further configured to: transmit the SSB at one of more of the set of SSB candidate positions using a third transmission power level if the measurement is within a third range, the third transmission power level being lower than the second transmission power level.

Aspect 20 is the apparatus of any of aspects 16-19, wherein the memory and the at least one processor are further configured to signaling a reduced transmission power level in the SSB.

Aspect 21 is the apparatus of any of aspects 16-20, wherein the reduced power level is represented by an offset from a regular power level.

Aspect 22 is the apparatus of any of aspects 16-21, wherein the offset is represented by a number of dB.

Aspect 23 is the apparatus of any of aspects 16-22, wherein the apparatus is a base station, and wherein to perform the measurement includes performing an LBT measurement for an unlicensed medium.

Aspect 24 is the apparatus of any of aspects 16-23, wherein the reduced transmission power level is signaled in a MIB transmitted from the base station.

Aspect 25 is the apparatus of any of aspects 16-24, wherein the apparatus is a user equipment, and wherein the memory and the at least one processor are further configured to: receive, from a base station, an SSB transmission configuration including the set of SSB candidate positions; and receive a sidelink reservation reserving a resource of the SSB candidate position, wherein the measurement comprises measuring a RSRP associated with the sidelink reservation.

Aspect 26 is the apparatus of any of aspects 16-25, wherein the SSB transmission configuration comprises a set of multiple threshold values for the measurement.

Aspect 27 is the apparatus of any of aspects 16-26, wherein the set of multiple threshold values includes multiple threshold values associated with different reduced transmission power levels.

Aspect 28 is an apparatus of wireless communication at a UE, comprising: a memory; and at least one processor coupled to the memory and configured to: receive an indication of a first transmission power for a first SSB transmission and a second transmission power for a second SSB transmission; and measure a RSRP value for each received SSB.

Aspect 29 is the apparatus of aspect 28, wherein the memory and the at least one processor are further configured to transmit a random access signal in a RO based on a highest RSRP value with respect to a transmitted power of a respective SSB.

Aspect 30 is the apparatus of any of aspects 28-29, wherein the UE received the indication in a MIB.

Aspect 31 is an apparatus for wireless communication including means for implementing a method as in any of aspects 1 to 12.

Aspect 32 is an apparatus for wireless communication including means for implementing a method as in any of aspects 13 to 15.

Aspect 33 is a computer-readable medium storing computer executable code, where the code when executed by a processor causes the processor to implement a method as in any of aspects 1 to 12.

Aspect 34 is a computer-readable medium storing computer executable code, where the code when executed by a processor causes the processor to implement a method as in any of aspects 13 to 15.

What is claimed is:

1. A method of wireless communication, comprising:
performing a measurement of a medium for transmission of a synchronization signal block (SSB); and
transmitting, based on the measurement, the SSB at an SSB candidate position from a set of SSB candidate positions from an SSB transmission configuration that includes the set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

2. The method of claim 1, further comprising:
dropping transmission of the SSB at one or more of the SSB candidate positions if the measurement is within a third range.

3. The method of claim 1, wherein the measurement is for a beam direction, and the SSB candidate position is associated with the beam direction.

4. The method of claim 1, further comprising:
transmitting the SSB at one of more of the set of SSB candidate positions using a third transmission power level if the measurement is within a third range, the third transmission power level being lower than the second transmission power level.

5. The method of claim 1, further comprising signaling a reduced transmission power level in the SSB.

6. The method of claim 5, wherein the reduced transmission power level is represented by an offset from a regular power level.

7. The method of claim 6, wherein the offset is represented by a number of decibels (dB).

8. The method of claim 1, wherein the method is performed at a base station, and performing the measurement includes performing a listen before talk (LBT) measurement for an unlicensed medium.

9. The method of claim 8, wherein the reduced transmission power level is signaled in a master information block (MIB) transmitted from the base station.

10. A method of wireless communication performed at a user equipment, comprising:
receiving, from a base station, a synchronization signal block (SSB) transmission configuration including a set of SSB candidate positions;
receiving a sidelink reservation reserving a resource of a SSB candidate postion from the set of SSB candidate postions;
performing a measurement of a medium for transmission of a synchronization signal block (SSB), wherein the measurement comprises measuring a reference signal received power (RSRP) associated with the sidelink reservation;
transmitting, based on the measurement, the SSB at the SSB candidate postion from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

11. The method of claim 10, wherein the SSB transmission configuration comprises a set of multiple threshold values for the measurement.

12. The method of claim 11, wherein the set of multiple threshold values includes multiple threshold values associated with different reduced transmission power levels.

13. An apparatus for wireless communication, comprising:
memory; and
one or more processors coupled to the memory and configured to:
perform a measurement of a medium for transmission of a synchronization signal block (SSB); and
transmit, based on the measurement, the SSB at an SSB candidate position from a set of SSB candidate positions from an SSB transmission configuration that includes the set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

14. The apparatus of claim 13, wherein the memory and the one or more processors are further configured to:
drop transmission of the SSB at one or more of the SSB candidate positions if the measurement is within a third range.

15. The apparatus of claim 13, wherein the measurement is for a beam direction, and the SSB candidate position is associated with the beam direction.

16. The apparatus of claim 13, wherein the memory and the one or more processors further configured to:
transmit the SSB at one or more of the set of SSB candidate positions using a third transmission power level if the measurement is within a third range, the third transmission power level being lower than the second transmission power level.

17. The apparatus of claim 13, wherein the memory and the one or more processors are further configured to signaling a reduced transmission power level in the SSB.

18. The apparatus of claim 17, wherein the reduced transmission power level is represented by an offset from a regular power level.

19. The apparatus of claim 18, wherein the offset is represented by a number of decibels (dB).

20. The apparatus of claim 13, wherein the apparatus is a base station, and wherein to perform the measurement includes performing a listen before talk (LBT) measurement for an unlicensed medium.

21. The apparatus of claim 20, wherein a reduced transmission power level is signaled in a master information block (MIB) transmitted from the base station.

22. An apparatus for wireless communication, comprising:
memory; and
one or more processors coupled to the memory and configured to:
receive, from a base station, a synchronization signal block (SSB) transmission configuration including a set of SSB candidate positions;
receive a sidelink reservation reserving a resource of the SSB candidate position from the set of SSB candidate positions, wherein the measurement comprises measuring a reference signal received power (RSRP) associated with the sidelink reservation;
perform a measurement of a medium for transmission of a synchronization signal block (SSB); and
transmit, based on the measurement, the SSB at an SSB candidate position from a set of SSB candidate positions, wherein transmitting the SSB comprises transmitting using a first transmission power level if the measurement is within a first range and transmitting using a second transmission power level if the measurement is within a second range, the second transmission power level being lower than the first transmission power level.

23. The apparatus of claim 22, wherein the SSB transmission configuration comprises a set of multiple threshold values for the measurement.

24. The apparatus of claim 23, wherein the set of multiple threshold values includes multiple threshold values associated with different reduced transmission power levels.

\* \* \* \* \*